(12) United States Patent
Barker et al.

(10) Patent No.: US 7,870,060 B2
(45) Date of Patent: Jan. 11, 2011

(54) BUNDLED FINANCIAL INSTRUMENTS

(75) Inventors: Peter Barker, Chicago, IL (US); Richard Co, Chicago, IL (US); Larry Grannan, Chicago, IL (US)

(73) Assignee: Chicago Mercantile Exchange, Inc., Chicago, IL (US)

( * ) Notice: Subject to any disclaimer, the term of this patent is extended or adjusted under 35 U.S.C. 154(b) by 189 days.

(21) Appl. No.: 11/858,616

(22) Filed: Sep. 20, 2007

(65) Prior Publication Data

US 2009/0037345 A1 Feb. 5, 2009

Related U.S. Application Data (60) Provisional application No. 60/953,168, filed on Jul. 31, 2007.

(51) Int. Cl.
*G06Q 40/00* (2006.01)
(52) U.S. Cl. .................. 705/37; 705/1; 705/4; 705/26; 705/39; 705/41
(58) Field of Classification Search .................. 705/37, 705/1, 4, 26, 39, 41; 714/2
See application file for complete search history.

(56) References Cited

U.S. PATENT DOCUMENTS

| | | | | |
|---|---|---|---|---|
| 5,819,230 | A * | 10/1998 | Christie et al. ................. | 705/4 |
| 6,035,287 | A * | 3/2000 | Stallaert et al. ............... | 705/37 |
| 6,223,169 | B1 * | 4/2001 | Mori et al. .................... | 705/41 |
| 7,013,289 | B2 * | 3/2006 | Horn et al. .................... | 705/26 |
| 2001/0037290 | A1 * | 11/2001 | Lai .............................. | 705/39 |
| 2002/0040304 | A1 * | 4/2002 | Shenoy et al. ................. | 705/1 |
| 2002/0169640 | A1 * | 11/2002 | Freeland ........................ | 705/4 |
| 2005/0108145 | A1 * | 5/2005 | Kastel et al. .................. | 705/37 |
| 2006/0184443 | A1 * | 8/2006 | Erez et al. ..................... | 705/37 |
| 2007/0239589 | A1 * | 10/2007 | Wilson et al. ................. | 705/37 |
| 2009/0019305 | A1 * | 1/2009 | Genetski et al. ............... | 714/2 |
| 2010/0169205 | A1 * | 7/2010 | Labuszewski et al. ......... | 705/37 |

OTHER PUBLICATIONS

Julian Walmsley, New Financial Instruments, 2nd Ed., John Wiley & Sons, Jan. 1998.*

(Continued)

*Primary Examiner*—Shahid R Merchant
*Assistant Examiner*—B. Joan Amelunxen
(74) *Attorney, Agent, or Firm*—Banner & Witcoff, Ltd.

(57) ABSTRACT

Networks, systems and methods that match orders for bundled financial instruments are disclosed. In one example, the bundled financial instrument includes packaged underlying financial instruments that together provide an economic equivalent exposure to a long-term investment vehicle. The bundled financial instrument may include any set of contracts considered a linear combination of a plurality of standardized contracts associated with an obligation to exchange an asset at a set price on a future date. An open position for the bundled financial instrument is a function of the prices for each of the standardized contracts of the bundle and remains open from execution of the order to the earlier of a maturity of the bundled financial instrument, a conversion of the bundled financial instrument into constituent parts of the linear combination of a plurality of standardized contracts, or in the case where the bundled instrument is fractional size contract, when multiple bundles are converted to a single position of a corresponding full-sized instrument.

24 Claims, 6 Drawing Sheets

OTHER PUBLICATIONS

Galen Burghardt et al., Hedging and Trading with Eurodollar Stacks, Packs, and Bundles, Derivative Quaterly, pp. 50-63, Summer 2000.*
Ming Fan et al., The Internet and the Future of Financial Markets, Communications of the ACM, vol. 43, No. 11, Nov. 2000.*
Kemal Saatcioglu et al., Design of a Financial Portal, Communications of the ACM, vol. 44, No. 6, Jun. 2001.*
Introducing the CME Eurodollar 5-Year E-mini Bundle, 2 pages, Copyright 2006.
Fees for CME Eurodollar 5-Year E-mini Bundle Futures and CME E-mini Eurodollar Futures, 1 page, copyright 2006.
Eurodollar; http://www.investopedia.com/terms/eurodollar .asp, downloaded Apr. 6, 2007.
CME Span Minimum Performance Bond Requirements; http://www.cme.com/html.wrap/wrappedpages/clearing/pbrates/PBISH, downloaded Apr. 6, 2007.
Becoming Fluent in Options on Futures; http://www.investopedia.com/articles/optioninvestor/02/061302.asp, downloaded Apr. 6, 2007, pp. 1 through 6.
CME Eurodollar 5-Year E-mini Bundle Futures; http://www.cme.com/trading/prd/about_E5B19636.html, downloaded Apr. 6, 2007, pp. 1-4.
CME Eurodollar 5-Year E-mini Bundle Futures. Listed CME Eurodollar 5-Year E-mini Bundle Futures Contracts, downloaded Apr. 6, 2007.
CME Eurodollar 5-Year E-mini Bundle Futures; http://www.cme.com/trading/prd/trading_hours_E5B19636.html, downloaded Apr. 6, 2007.
CME Eurodollar 5-Year E-mini Bundle Futures; http://www.cme.com/trading/prd/contract-spec_E5B19636.html, downloaded Apr. 6, 2007.
CME EUrodollar 5-Year E-mini Bundle Futures; http://www.cme.com/trading/prd/overview_E5B19636.html, pp. 1 through 2, , downloaded Apr. 6, 2007.
E-mini (Stock Index Futures); http://www.investopedia.com/terms/e/emini.asp, downloaded Apr. 6, 2007.
CME Market Data Operations, www.cme.com/trading/clr/clradv, dated Sep. 8, 2006, 2 pages.
CME Advisory Notice, http://www.cme.com/clearing/clr/clradv, dated Sep. 12, 2006, 3 pages.

* cited by examiner

Figure 1

PRIOR ART

BUNDLED FINANCIAL INSTRUMENTS

RELATED APPLICATIONS

This application claims priority to U.S. Provisional Application No. 60/953,168, entitled "Bundled Financial Instruments" filed Jul. 31, 2007; the disclosure of which is expressly incorporated herein by reference in its entirety.

FIELD OF THE INVENTION

The present invention relates to systems and methods for managing trading of investment vehicles, and particularly, bundled financial instruments.

DESCRIPTION OF THE RELATED ART

Traders often desire transactions in financial instruments that provide exposure to strategic points on an investment curve. For example, interest rate products may provide exposure to a desirable point on an interest rate yield curve. To obtain a desirable position, a trader may place an order for a series of multiple consecutive futures contracts to build out the desired exposure. After the order is executed, the trader will have multiple open positions, each position corresponding to one of the consecutive futures contract. For each of the contracts, the trader may also incur additional costs associated with each contract.

The Chicago Mercantile Exchange has listed the E-mini S&P 500 Stock Index futures contracts and the S&P 500 Stock Index futures contracts, the transaction in which are cleared through the Clearing House of the Chicago Mercantile Exchange. That is the Clearing House acts as a central counterparty for each side of a transaction. The E-mini S&P 500 Stock Index and the S&P 500 Stock Index futures contracts have substantially similar terms and conditions, including the expiration day, daily settlement prices and final settlement price determination, with the exception that the notional values for the E-mini S&P 500 Index Futures contract differ. The CME E-mini® S&P 500® futures contract is $\frac{1}{5}$th the size of a standard CME S&P 500® futures contract and it closely tracks the price movements of the S&P 500® Index.

Figure 1:
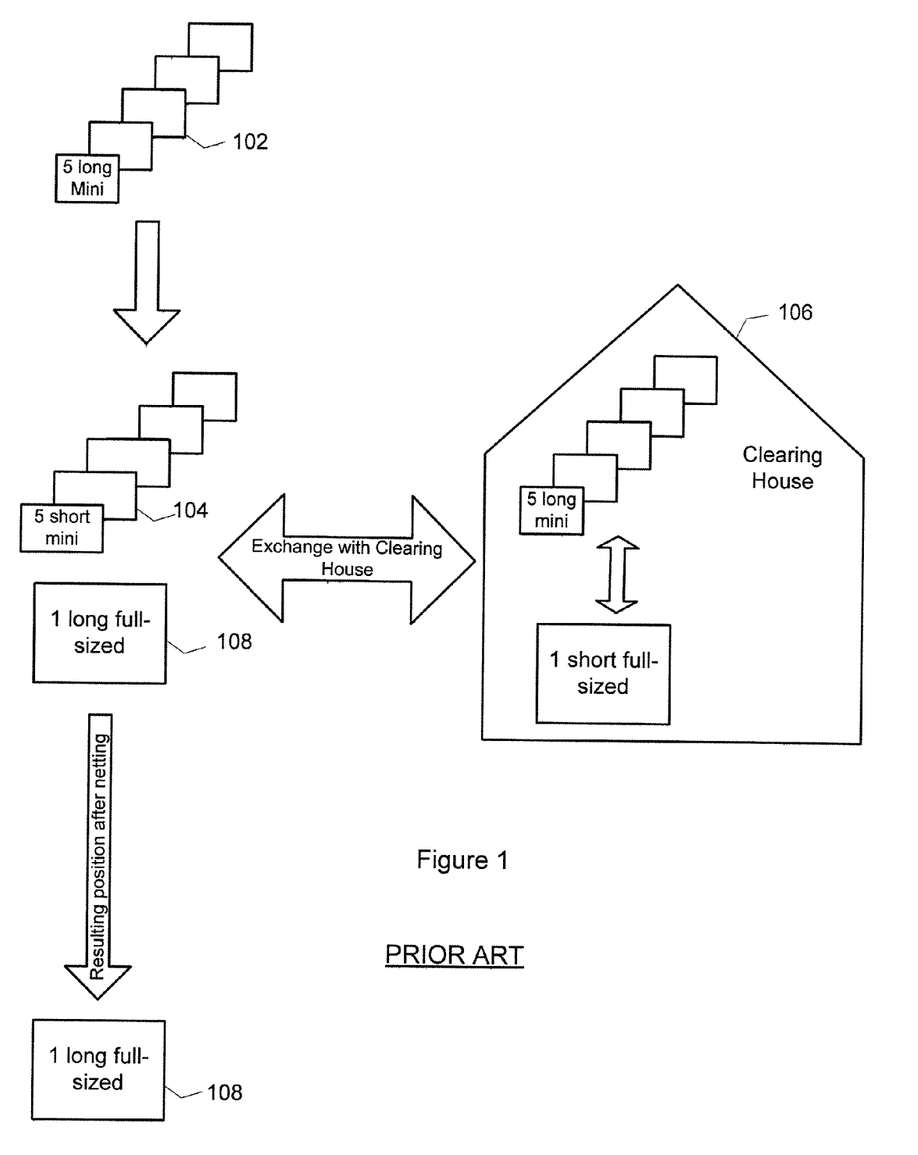
FIG. 1 is a diagram depicting a conversion between multiple contracts through a central counterparty.

The E-mini S&P 500 Stock Index and the S&P 500 Stock Index futures contracts are considered fungible, such that a position holder can engage in a transaction with the CME Clearing House to extinguish offsetting positions. FIG. 1 illustrates an example of how fungible positions may be exchanged or converted through a central counterparty. In the example, multiple positions associated with one or more fractional-sized contracts 102 each represent a separate position for the holder. In addition, each position is a fraction of a corresponding full-sized contract to provide an efficient way to trade a benchmark with a single contract.

The multiple same side open positions may be exchanged at the holder's discretion, through a central counterparty to form an equivalent position in one or more full-sized contracts. In the example of FIG. 1, the fractional-sized contract (e.g., CME E-mini® S&P 500® futures contract) is $\frac{1}{5}^{th}$ the size of the corresponding full sized contract (e.g., the S&P 500 Stock Index futures contract). The holder of the 5 open positions in the fractional-sized contracts may exchange, these 5 positions for a corresponding position in the associated full-sized contract. To convert the positions, the holder trades the 5 long positions with the clearing house 106, and receives 5 short positions 104 for the same contract, thus canceling out the 5 open long positions 102. The clearing house 106 also acts as a counterparty with the holder for the corresponding full-sized contract by taking a short position in the corresponding full-sized contract to the trader's long position in the corresponding full-sized contract 108. Thus, the trader receives one long position in the full-sized contract 108. The clearing house has a net zero position since the daily settlement prices of the 5 fractional-sized and the single full-sized are identical.

In another example, a position holder with five long positions in E-mini S&P 500 index futures and one short position in the S&P 500 index futures can simultaneously buy one S&P 500 index futures and sell five E-mini S&P 500 index futures at the same price, with the Clearing House as the counterparty to this trade. After the trade with the Clearing House, the position holder's long and short positions in E-mini S&P 500 index futures will offset. Similarly, the position holder's long and short positions in the S&P 500 Index futures will also offset. Therefore, all pre-existing positions in both contracts for the position holder will be extinguished following the trade. Effectively, the position holder has the discretion to either maintain separate positions in the two contracts, or recognize all or some of the offsetable positions in the two contracts.

In addition, following a trade, the central counterparty retains in its books, the offset positions in the two contracts, effectively fulfilling the requirement in the futures market that there is a short interest to every long interest for each outstanding contract. Since the prices for the two contracts are substantially identical, both at the time of the transaction between the position holder and the central counterparty, as well as at every intervening daily settlement, up to and including the final settlement, the central counterparty is not exposed to any market risk in the offsetting positions.

Other portfolio instruments, such as a positions-bundling tool, may simplify complicated trading strategies. In an example, a trader may have a portfolio including a combination of one long position of each of twenty consecutive quarterly three-month Eurodollar futures. The combination is often traded, and mimics a fixed income instrument with a tenor of five years. A trader may obtain the positions through a single transaction, but the transaction will result in a position for one of each of the twenty consecutive quarterly expirations of the Eurodollar futures. Thus, with a single trade, the trader will have multiple positions in his book. The resulting positions will be indistinguishable from Eurodollar futures positions that the trader may have established in other transactions. Depending on the application, this may or may not be the desired outcome.

To execute a trade in the combination of Eurodollars simultaneously, market participants rely on a quoting convention that may not be intuitive to less frequent traders of Eurodollar futures. Effectively, the price of the combination is quoted as the average change of the prices from the previous day's settlement prices for each contract in the combination. As such, market participants will need to learn the prices from the previous day to determine the prices at which the transaction today would be executed.

Therefore, it is desirable for trading instruments and/or investment vehicles to overcome one or more of these drawbacks in current systems and methods.

BRIEF SUMMARY OF THE INVENTION

By way of introduction, a system, apparatus, and/or method for managing and bundling financial instruments provides an intuitive, easy to understand packaging of investment vehicles that simplifies trading and offsetting of positions. Embodiments for managing transactions in bundled financial instrument may be achieved by one or more devices, systems, networks, and/or processes for administering, communicating, managing, placing, entering, receiving, storing, matching, clearing, presenting, listing and/or confirming orders for bundled financial instruments.

In one embodiment, a system includes electronic devices (e.g., trading terminals) and an electronic exchange for a financial instrument. The electronic devices may create an order for a bundled financial instrument to submit to the exchange. The electronic exchange may include a match engine module, an order processing module, a mark-to-market module, a conversion module, a storage device, and other components for receiving, processing, and managing the order for the bundled financial instrument. In an embodiment, the bundled financial instruments includes financial instruments including a linear combination of a plurality of standardized contracts associated with an obligation to exchange an asset at a set price on a future date. Each of the standardized contracts may have an associated price that varies, such as with changes in market conditions and events. The open position of the bundled financial instrument may be a function of the prices for each of the standardized contracts and may be converted into constituent linear combination of the standardized contracts.

In another embodiment, the financial instruments each have a notional value that is a fraction of a corresponding full-sized financial instrument. As such, the bundled financial instrument may be fungible with the full-sized financial instrument and other bundled instruments.

The foregoing summary is provided only by way of introduction. The features and advantages of the bundled financial instrument and systems for administering, communicating, managing, placing, entering, receiving, matching, clearing, presenting, listing and/or confirming orders for bundled financial instruments may be realized and obtained by the instrumentalities and combinations pointed out in the claims. Nothing in this section should be taken as a limitation on the claims, which define the scope of the invention. Additional features and advantages will be set forth in the description that follows, and in part will be obvious from the description, or may be learned by practice of the present invention.

BRIEF DESCRIPTION OF THE DRAWINGS

Examples of the invention are described with reference to the accompanying drawings, in which components, features and integral parts that correspond to one another each have the same reference number, wherein.

DETAILED DESCRIPTION OF THE INVENTION

Various aspects of the invention may take physical form in certain parts and steps, embodiments of which will be described in detail in the following description and illustrated in the accompanying drawings that form a part hereof. In one example, aspects of the invention may be used to implement a 5-year mini bundle futures contract. The mini bundle futures contract includes constituent contracts that are a fraction (e.g., one-tenth) of the size of a corresponding full-sized futures contract. Furthermore, the bundled financial instrument, or bundled contract, may be quoted in terms of a price, rather than a net change from a previous day's settlement. This bundled financial instrument may provide traders, exchanges, and other involved in financial markets (e.g., the interest rate strip market) with increased liquidity. In addition, the bundles financial instrument may complement current interest rate strip transaction processing and allow customers to trade, convert, combine, and offset their positions in fungible markets.

A bundled financial instrument in accordance with aspects of the invention may include, among other aspects, a conversion aspect and/or an exploding aspect. For example, at expiration of the bundled financial instrument, the bundled financial instrument may be processed to remove the bundled position. The removed position may be replaced with positions in the remaining constituent contracts. Likewise, multiple mini bundles may be combined to form a full-sized contract. Before maturity, a holder of an open position in a bundled financial instrument may exchange his open position with a counter party, such as the clearing house of CME, to obtain each position of the constituent contracts of the bundled instrument.

At least one benefit of the bundled financial instrument is that it may minimize the number of futures contracts created. In particular, the bundled financial instrument may be purchased or sold as a single contract, where the resulting position may remain until maturity of the bundle, or until the holder decides to take a counter position, convert the position to the constituent contracts, or combine positions to obtain a position in a corresponding contract. Moreover, holders of positions may convert positions between the bundled instruments and strips of full-sized and mini instruments (e.g., futures contracts). One skilled in the art will appreciate that an E-mini Eurodollar bundled future contract is a stand-alone bundled financial instrument with twenty consecutive e-mini Eurodollar futures contracts as an underlying and that can be traded on Globex (i.e., an electronic trading environment).

In accordance with aspects of the present invention, a free-standing bundled contract, or bundled financial instrument, representing the interest in its underlying futures contract can be established. In an example, the bundled financial instrument includes a five-year Eurodollar Bundle Contract representing an interest in one each of the twenty consecutive expirations of the Eurodollar futures contract. A long position in the five-year Eurodollar Bundle Contract is equivalent to one each of the long positions in the twenty underlying Eurodollar futures.

To maintain equivalence between the free-standing bundled financial instrument and its underlying futures contracts, the free-standing bundled financial instrument shall terminate at a time no later than the earliest expiration of the underlying futures contract. At termination, the remaining unextinguished long and short positions shall be obliged to cancel the positions in the bundled financial instrument in exchange for the equivalent long and short positions in underlying futures contracts. Further, this forced conversion is performed by the central counterparty automatically at the termination. Thus, given the free-standing nature of aspects of the present invention, the trade may remain in a trader's book as a single trade, rather than a series of twenty trades.

Prior to the termination, a conversion device, or conversion module, can be employed. More particularly, a central counterparty can stand to engage in trades to simultaneously buy the individual underlying futures contracts and sell the bundled financial instrument at the average price of its underlying futures contracts. Alternatively or in addition, the central counterpart can stand to engage in trades to simultaneously sell the individual underlying futures contracts and buy the bundled financial instrument at the average price of its underlying futures contracts. That is, a position holder with a long position can enter into a transaction with the central counterparty to sell a bundle contract and buy the underlying futures simultaneously. Following the transaction, the long and short positions in the bundled financial instrument shall offset, leaving only the long positions in the underlying futures.

Following the transaction, the central counterparty retains the corresponding long and short positions in the bundle and the underlying futures contracts. As such, overall long open interest and short open interest will remain substantially unaffected in the bundle as well as in each of the underlying futures contract, except for the internal offsets within the book of the central counterparty. One long position will remain for each short position in each single futures contract. In addition, the central counterparty will not be exposed to any market risk in the exchange because the price at which each offsetting transaction is entered into by the central counterparty are set at offsetting levels and the intervening daily settlement prices, up to and including a last settlement price immediately prior to the forced exchange of the positions at termination are also set at offsetting level. That is a gain on one side of the trade will always offset the loss on the other side of the trade, except for insignificant rounding differences.

Position holders may, at their discretion, convert a position to the underlying futures contracts or hold the position in the bundled financial instrument as a portfolio instrument. In addition or alternatively, a position holder with one or more positions in the underlying futures can assemble the positions, and exchange the assembled position for a position in the bundled financial instrument.

In accordance with aspects of the present invention, the bundled financial instrument includes a linear combination of standardized contracts. Each underlying contract of the bundled financial instrument may have a fixed weight with respect to a composition of the bundle. In an embodiment, each contract is associated with an obligation to exchange an asset at a set price on a future date. The asset may be any class or multiple classes of assets, including equities, commodities, bonds, currencies, securities, interest rates, and any currently known or later developed derivatives including futures, forwards, options, swaps, and swaptions. Each of the contracts also may have an associated variable price that varies according to any or combinations or factors.

The price of the bundled financial instrument may be quoted in terms of an absolute price. The price may be determined according to a predefined function of the prices of each of the constituent linear combination of standardized contacts of the bundled financial instrument. In an embodiment, the price for the bundled financial instrument is an average of the price of each of the constituent parts of the contract.

A transaction in a bundled financial instrument may result in an open position associated with the bundled financial instrument. That is, the sale or purchase of a bundled financial instrument results in an open position for the holder of the bundled instrument. The open position may remains for the holder of the bundled financial instrument until the bundled financial instrument matures, or expires, or the bundled financial instrument is optionally exchanged or converted through the central counterparty, into each of the constituent parts, or underlying contracts, of the bundled financial instrument, or is optionally combined with multiple same side positions and converted through a central counterparty to form one or more positions with a corresponding full-sized contract. At maturity, or expiration, the holder may receive open positions in each of the remaining constituent parts of the bundled financial instrument, or may optionally roll the open positions in each of the remaining constituent parts of the bundled financial instrument into a new, or next, bundled financial instrument.

Figure 4:
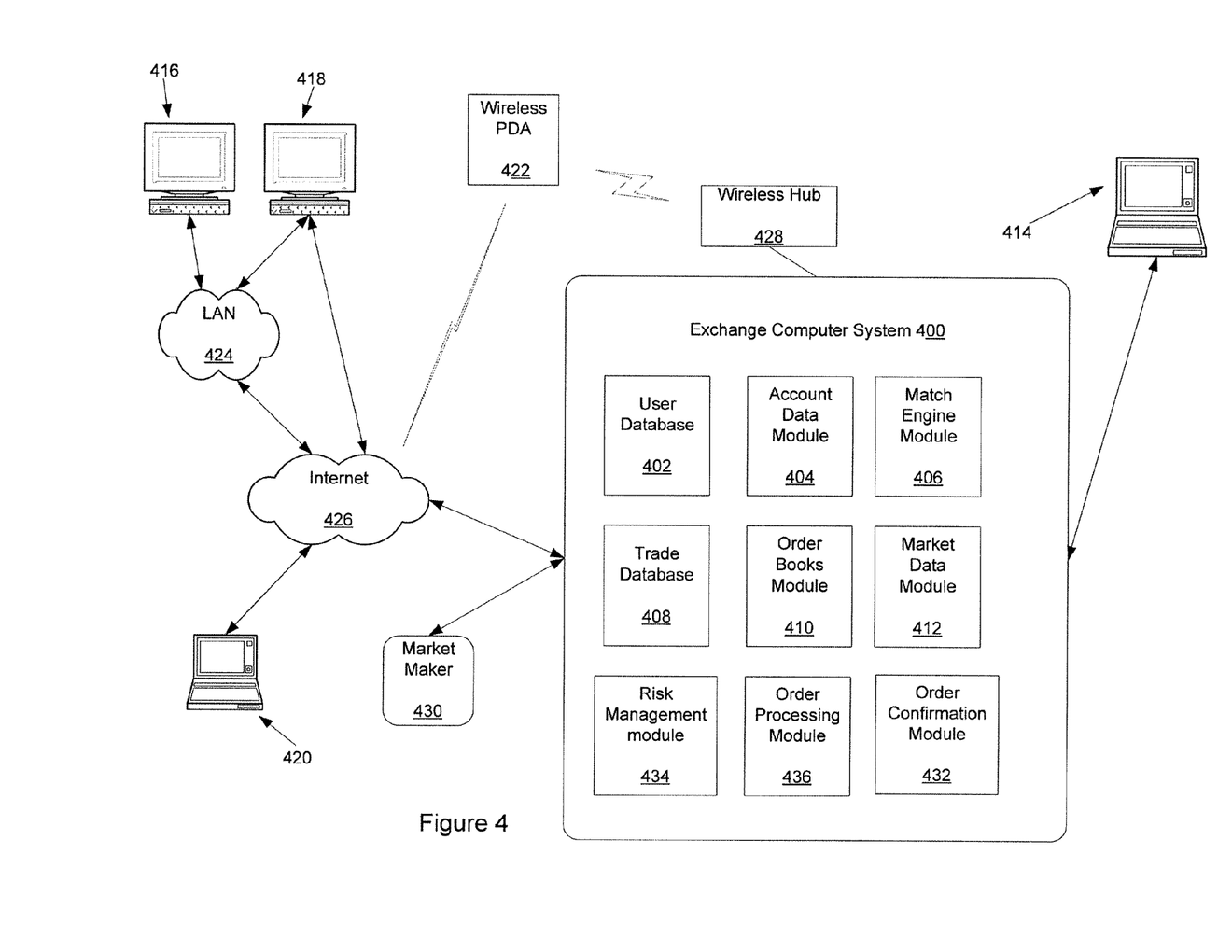
FIG. 4 illustrate an exemplary system for trading, managing, administering, processing bundled financial instruments, and portfolios including bundled financial instruments.

The open position may vary as the price of the bundled financial instrument varies. The open position may be determined periodically, such as through a mark-to-market process (e.g., using a mark-to-market module). For example, profits and/or losses associated with the open position may be determined one or more times per day, through a process where the current value of open interest is determined. In one example, a mark-to-market module may be configured and used to determine, for example periodically, a current open position associated with the bundled financial instrument accordingly. The mark-to-market module may be situated like various other modules depicted in the exchange computer system 400.

In an additional or alternative embodiment, each of the standardized contracts of the linear combination of standardized contracts may have a notional value that is a fraction of a corresponding full-sized standardized contract. In particular, a portfolio contract representing a collection of fractional positions in the underlying instruments may be provided. That is, each of the constituent parts of the bundled financial instrument may have a full-sized counterpart contract, where the contracts are related by a predefined ratio. In an embodiment, a bundled financial instrument includes 20 consecutive mini-sized futures contracts each relating to a corresponding full-sized quarterly Eurodollar futures contract traded at the CME Group at 20 South Wacker Drive in Chicago, Ill., where each of the 20 consecutive contracts have a notional value that is $\frac{1}{10}^{th}$ the size of the corresponding full-sized Eurodollar futures contract. The bundled financial instrument is fungible with the full-sized standardized contract, and vice versa. In an example, a position holder can exchange 10 standard sized bundled financial instrument into ten of each of the underlying instruments (i.e., 10 of each). Each set of the ten one-tenth sized underlying contracts can then be combined and converted into a regular sized Eurodollar contract.

Figure 2:
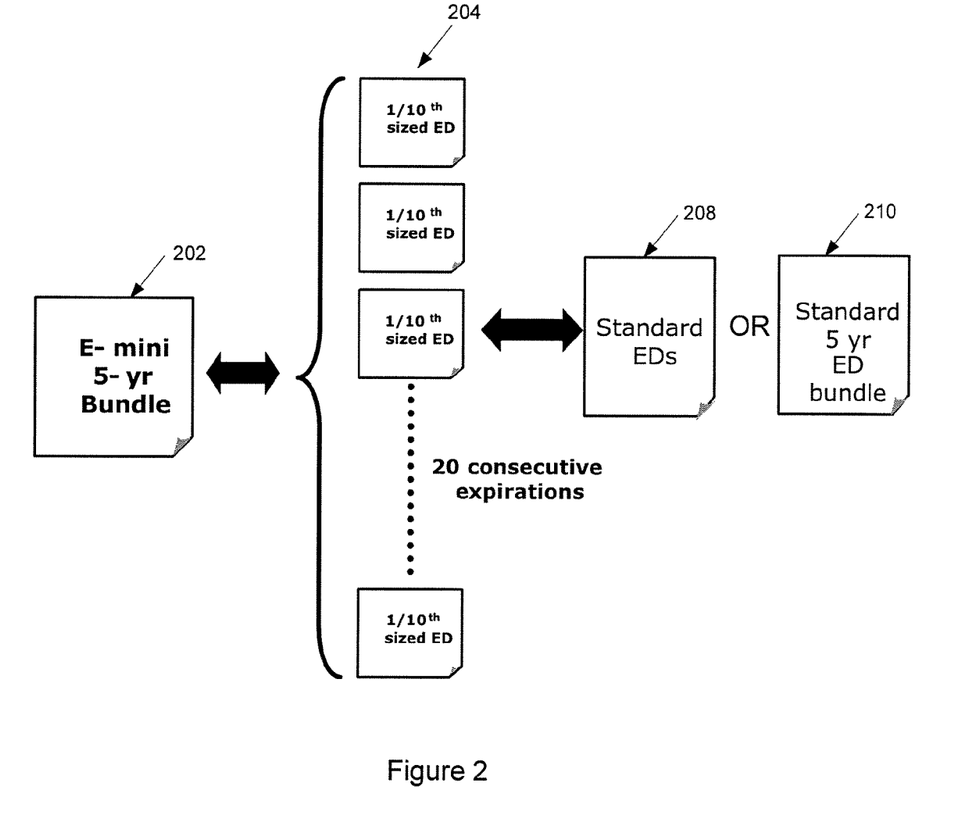
FIG. 2 shows an illustrative diagram depicting a conversion of a bundled financial instrument in accordance with various aspects of the invention.

FIG. 2 illustrates an example of a conversion or exchange of a bundled financial instrument 202 with a central counterparty, such as the CME Clearing House. The bundled financial instrument 202 is a linear combination of standardized contracts, each having a fixed weight with respect to a composition of the bundle. The linear combination may include standalone futures contracts. In the exemplary embodiment of FIG. 2, the standalone contracts include a strip of 20 consecutive future contracts 204. In an embodiment, the 20 consecutive contracts may be mini, or fractional-sized, futures contracts each corresponding to a full-sized contract. For example, the strip of 20 consecutive futures contracts 204 are mini Eurodollar future contract that are one-tenth the size of the standard Eurodollar future contract. That is, in the exemplary embodiment of FIG. 2, an E-mini 5-Year Eurodollar bundle future has a notional value per leg, or constituent contract, of $100,000 and a contract value factor of 5,000. Other combinations of constituent parts of the bundled financial instrument are also contemplated.

Multiple bundled financial instruments may be listed or made available for trading. In the exemplary embodiment of 5 year E-mini bundle contracts, four E-mini bundled contracts are exchange listed with start date that correspond to the next four quarterly CME Eurodollar expirations, although more or less contracts may be mad available for trading. In the exemplary embodiment, each bundled financial instrument expires on the third exchange business day prior to the third Wednesday of the quarterly contract month (generally a Friday). Each open position for a bundled financial at expiration will break into the constituent contracts that constitute the bundled financial instrument.

The bundled financial instrument 202 supports the ability to convert or exchange between multiple bundled financial instruments 202 and one or more strips of full-sized financial instruments 208. Similarly, the bundled financial instrument supports the ability to convert between bundled financial instruments 202 and one or more equivalent financial instruments 210.

The bundled financial instrument 202 may expire at maturity. For example, the bundled financial instrument expires with the expiration of the lead contract of the strip of 20 consecutive futures contracts 204 (i.e., the contract with the earliest expiration date). At expiration, the first, or lead contract of the strip 204 typically expires, leaving the holder with fractional positions in the remaining contracts. An open position in the bundled financial instrument at expiration is settled and a profit and/or loss determination made. Positions associated with unexpired constituent parts of the bundled financial instrument may remain open. The fractional positions may be converted or transformed into positions in each of the corresponding full sized contract 208 or combined and converted into a standard full-sized contract 210. Likewise, the remaining positions may be combined with another contract at the tail end of the strip and rolled into the next bundled financial instrument.

In an example, a free-standing fractional-sized bundled financial instrument 202 may trade in ¼ basis points (e.g., 94.6775, 94.6800, 94.6825, etc.) In an exemplary embodiment, a 5 year E-mini bundled futures contract 1 bp=$50.00, and therefore ¼ bp=$12.50. In another exemplary embodiment, a 3-yr mini bundle future may have a basis point of $30.

The bundled financial instrument 202 has a daily settlement that is a function of the price of the underlying or constituent contracts. In an exemplary embodiment, the daily settlement price is the average of the underlying contracts. The number of digits to which the average is determined may be dependent on the status of the corresponding full-sized contracts. For rounding considerations, the daily settlement price may be determined to one additional significant digit over the corresponding full-sized contracts.

Figure 3:
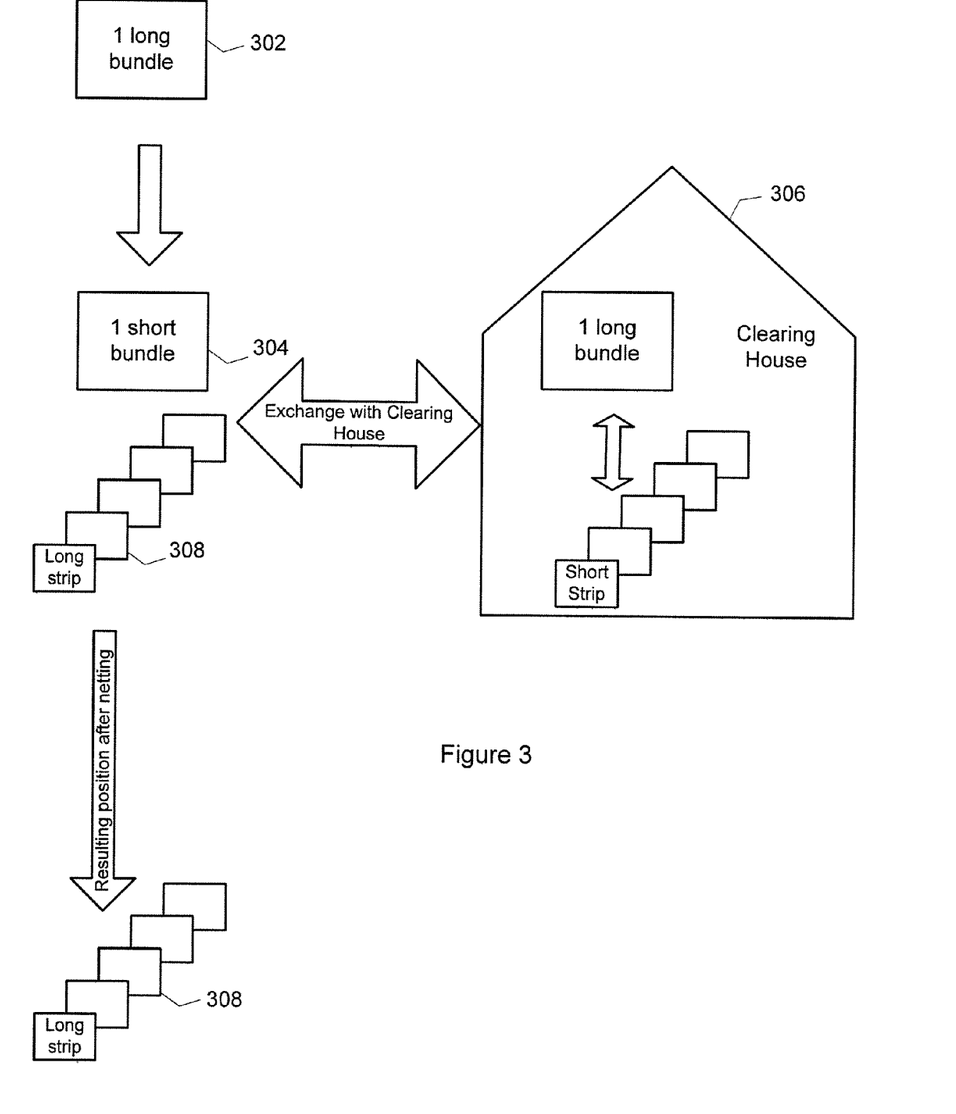
FIG. 3 is a diagram depicting an example of a conversion of a bundled financial instrument through a central counterparty.

FIG. 3 illustrates an example of the conversion of a bundled financial instrument 302 through a central counterparty 306. In an embodiment, the central counterparty 306 may be a clearing house, such as the CME Clearing House. The diagram of FIG. 1 illustrates a process by which the clearing house 306 may act as a counterparty for the purposes of affecting the conversion of the bundled financial instrument 302. In the example, a holder of a bundled financial instrument 302 has long position that has not yet expired. The bundled financial instrument includes a strip of 20 consecutive a fractional sized contracts, such as the 5 year E-mini bundle futures contract, which is a pre-packaged series of contracts that facilitates rapid execution of a CME Eurodollar strip in a single contract. The Eurodollar 5-Year E-mini Bundles may provide the economic equivalent of 20 quarterly CME Eurodollar expirations in a single contract. The 5-Year E-mini Bundle a notional value that is ⅒th the notional value of a corresponding convention 5 year Eurodollar bundle contracts and a one-basis point value of $50. That is, ten E-mini Bundles equal one conventional CME 5-Year Eurodollar Bundle. The bundled contract is quoted in terms of price rather than net change from the previous day's settlement, in contrast to traditional CME Eurodollar Bundles. Further, a holder may optionally exchange or convert ten of the CME E-mini Bundles to a full-sized strip of 20 consecutive CME Eurodollar future and daily settlement prices for 5-Year E-mini Bundles are equal to the average price of the twenty quarterly Eurodollar futures that make up the traditional 5-year Bundle.

The bundled financial instrument 302 may be exchanged for the corresponding full-sized contract. As shown in FIG. 3, a bundle financial instrument 302 is exchanged with a clearing house to form a strip of the underlying contracts 308. To do so, the holder of the bundled financial instrument 302 exchanges or trades the open position long on the bundled financial instrument 302 with the clearing house. In return, the holder receives 1 short position 304 for the same contract, thus canceling out the open long positions on the bundled financial instrument 102. The clearing house 106 acts a counterparty to the holder by taking short positions in the strip of the underlying contracts of the bundled financial instrument to the holder's long positions in the strip of underlying contracts 308. Thus, the trader receives long positions in a strip of the underlying contracts 308. The clearing house 306 has a net zero position since the daily settlement prices of the bundled instrument and the strip are identical.

The bundled financial instrument 302 may include a linear combination of standardized contracts where each contract of the bundled financial instrument may have a fixed weight with respect to a composition of the bundle. In an embodiment, each contract is associated with an obligation to exchange an asset at a set price on a future date where the asset may be any class or multiple classes of assets, including equities, commodities, bonds, currencies, securities, interest rates, and any known or later developed derivatives including futures, forwards, options, swaps, and swaptions.

Each of the contracts also may have an associated variable price quoted in terms of absolute price and determined accord to a predefined function of the prices of each of the constituent linear combination of standardized contacts of the bundled financial instrument. In an embodiment, the price for the bundled financial instrument is an average of the price of each of the constituent parts of the contract.

A transaction in a bundled financial instrument may result in an open position associated with the bundled financial instrument that may remain after a execution of the transaction for the bundled financial instrument and until the bundled financial instrument matures, or expires, or the bundled financial instrument is optionally exchanged through a central counterparty, to each of the constituent parts of the bundled financial instrument, or is optionally combined with multiple same side positions and converted through a central counterparty to form one or more positions with a corresponding full-sized contract.

Although the example of FIG. 3 illustrate how the bundled financial instrument may be converted through the central counterparty, other combinations are also possible. The holder may have any number of positions with any combinations of sides on the bundled financial instrument. In another example, the holder may have a position for 27 bundled financial instruments. Using a conversion module, a conversion transaction may be created, where the holder may be provided with a variety of options to exchange or convert the 27 positions including combinations of sales or exchanges of the positions. Option may include a) exchanging the 27 positions to a strip of 27 mini futures; b) a strip of 17 mini futures and one full sized future; or c) a strip of 7 mini futures and a two full sized futures.

The bundled financial instrument 302 may have a last day of trading or settlement date for a trading period. At expiration of the bundle financial instrument, ending long and ending short positions in the bundle financial instruments may be removed. This is completed by moving the ending long and ending short position quantities into "expired long" and "expired short" buckets, such as the buckets used with options type contracts. The ending long and ending short quantities may be adjusted to zero. Corresponding transactions for mini and big Eurodollar futures may be created at that day's settlement price to minimize any variation. When creating the corresponding transactions, the number of mini contracts created may also be minimized. The following business day after expiration, such as expiration Monday for the lead future, the expiring mini or big financial instrument future will be treated normally, like any cash-settled future, being marked-to-market for the final time, and then auto-adjusted away. In one example, nineteen contracts will remain.

Alternatively, if options type contracts are part of the bundled financial instrument, then they may expire (or be exercisable) on the same day as the bundled financial instrument, or on an earlier date. In accordance with aspects of the invention, in one embodiment no modification may be required to the exchange 100 to support this feature.

The present invention is not limited to a portfolio representing long only or short only positions in a collection of instruments. More particularly, the underlying contracts for a bundled financial instrument may include both long and short positions in various underlying instruments, provided that the quotation convention is appropriately defined. Further, the underlying instruments of the bundled financial instrument may have different or unequal weights. In an example, a "Curve Spread" instrument may form one or more underlying contracts. A long position in the Curve Spread instrument represents one long position in the nearest expiring quarterly Eurodollar futures, two short positions in the next to the nearest Eurodollar futures, and one long position in the second deferred Eurodollar futures. One skilled in the art will recognize that there is an infinite number of possible combinations.

FIG. 4 illustrates an exemplary system for trading, managing, administering, processing bundled financial instruments, and portfolios including bundled financial instruments. In illustrative embodiments, systems, methods and apparatuses for administering, communicating, managing, placing, entering, receiving, storing, matching, clearing, presenting, listing and/or confirming orders for bundled financial instruments may be achieved in many different forms, formats, and designs. Embodiments may take the form of one or more devices, systems, distributed networks, data processing systems, and/or processes and should not be construed as limited to the illustrative embodiments set forth herein. An illustrative trading network environment for implementing trading systems and methods is shown in FIG. 4.

An exchange computer system 400 receives orders and transmits market data related to orders, trades and related information, such as orders, trade and information related to bundled financial instruments. Exchange computer system 400 may be implemented with one or more mainframes, servers, gateways, controllers, desktops or other computers. The exchange computer system 400 may include one or more modules, databases, and other components, such as those illustrated in FIG. 4.

A user database 402 may include information identifying traders and other users of exchange computer system 400. Such information may include user names and passwords. A trader operating an electronic device (e.g., computer devices 414, 416, 418, 420 and 422) interacting with the exchange 400 may be authenticated against user names and passwords stored in the user database 412. Furthermore, an account data module 104 may process account information that may be used during trades. The account information may be specific to the particular trader (or user) of a electronic device interacting with the exchange 400.

A match engine module 406 may match bid and offer prices for orders configured in accordance with aspects of the invention. Match engine module 406 may be implemented with software that executes one or more algorithms for matching bids and offers for bundled financial instruments in accordance with aspects of the invention. Furthermore, an order book module 410 may be included to compute or otherwise determine current bid and offer prices. The order book module 410 may be configured to calculate the price of a bundled financial instrument based on an average price of the plurality of short-term financial instruments from the prior trading day's close. The average may be a weighted to reflect the percentage of the total bundle that a particular short-term financial instrument constitutes. Moreover, a trade database 408 may be included to store information identifying trades and descriptions of trades. In particular, a trade database may store information identifying or associated with the time that an order was executed and the contract price. The trade database 408 may also comprise a storage device configured to store at least part of the orders submitted by electronic devices operated by traders (and/or other users). In addition, an order confirmation module 432 may be configured to provide a confirmation message when the match engine module 406 finds a match for an order and the order is subsequently executed. The confirmation message may, in some embodiments, be an e-mail message to a trader, an electronic notification in one of various formats, or any other form of generating a notification of an order execution.

A market data module 412 may be included to collect market data and prepare the data for transmission to users. In addition, a risk management module 434 may be included to compute and determine a user's risk utilization in relation to the user's defined risk thresholds. An order processing module 436 may be included to receive data associated with an order for a bundled financial instrument. The module 436 may decompose delta based and bulk order types for processing by order book module 410 and match engine module 406. The order processing module 436 may be configured to process the data associated with the orders for bundled financial instruments. In an embodiment the processing functionality includes converting the bundled financial instrument into the plurality of short-term financial instruments defined in its contract. A conversion module (e.g., converter) may be included that is responsive to requests of holders of corresponding open positions to convert a bundled financial instrument into constituent parts of the linear combination of a plurality of standardized contracts. The conversion may be triggered by the earliest expiration of any of the plurality of short-term financial instruments as described in this disclosure. In one example, the conversion module may convert the bundled financial instrument into constituent financial instruments at maturity of the bundled financial instrument. In yet another example, the conversion module may convert the bundled financial instrument into constituent financial instruments at expiration of a leading contract of the plurality of standardized contracts.

The trading network environment shown in FIG. 4 includes computer (i.e., electronic) devices 414, 416, 418, 420 and 422. The computer devices 414, 416, 418, 420 and 422 may include one or more central processors, or controllers, that control the overall operation of the computer. The computer devices 414, 416, 418, 420 and 422 may include one or more system buses that connect the central processor to one or more components, such as a network card or modem. The computer devices 414, 416, 418, 420 and 422 may also include interface units and drives for reading and writing data or files. Depending on the type of computer device, a user can interact with the computer with a keyboard, pointing device, microphone, pen device or other input device. Computer device 414 is shown communicatively connected to exchange computer system 400. Exchange computer system 400 and computer device 414 may be connected via a T1 line, a common local area network (LAN) a wireless communication device or any other mechanism for communicatively connecting computer devices.

Computer (i.e., electronic) devices 416 and 418 are coupled to a local area network ("LAN") 424. LAN 424 may have one or more of the well-known LAN topologies and may use a variety of different protocols, such as Ethernet. Computers 416 and 418 may communicate with each other and other computers and devices connected to LAN 424. Computers and other devices may be connected to LAN 424 via twisted pair wires, coaxial cable, fiber optics or other media. Alternatively, a wireless personal digital assistant device (PDA) 422 may communicate with LAN 424 or the Internet 426 via radio waves. PDA 422 may also communicate with exchange computer system 400 via a conventional wireless hub 428. As used herein, a wireless PDA 422 includes mobile telephones and other devices that communicate with a network via radio waves. FIG. 4 also shows LAN 424 connected to the Internet 426. LAN 424 may include a router to connect LAN 424 to the Internet 426. Computer device 420 is shown connected directly to the Internet 426. The connection may be via a modem, DSL line, satellite dish or any other device for communicatively connecting a computer device to the Internet.

One or more market makers 430 may maintain a market by providing substantially constant bid and offer prices for a financial instrument, such as a derivative or security, to exchange computer system 400. Exchange computer system 100 may also exchange information with other trade engines. Numerous additional computers and systems may be coupled to exchange computer system 400. Such computers and systems may include clearing, regulatory and fee systems.

The operations of computer devices and systems shown in FIG. 4 may be controlled by computer-executable instructions stored on computer-readable medium (e.g., in a data storage device such as a hard drive, etc.). Embodiments also may take the form of electronic hardware, computer software, firmware, including object and/or source code, and/or combinations thereof. Embodiment may be stored on computer-readable media installed on, deployed by, resident on, invoked by and/or used by one or more data processors, controllers, computers, clients, servers, gateways, networks of computers, and/or any combinations thereof. The computers, servers, gateways, may have one or more controllers configured to execute instructions embodied as computer software. For example, computer device 416 may include computer-executable instructions for receiving order information from a user and transmitting that order information to exchange computer system 400. In another example, computer device 418 may include computer-executable instructions for receiving market data from exchange computer system 400 and displaying that information to a user.

An embodiment may include software stored and executed on an electronic device such as one or more traders terminals, connected to a match server having electronic components configured to carry out instructions according to a computer program stored on a computer-readable storage medium, such as a memory, hard disk, CD-ROM, optical storage device, magnetic storage device and/or combinations thereof to match orders for bundled financial instruments. The electronic device may be a computing device having a programmable controller or processor. For example the electronic device may be a personal computer, laptop or handheld computer, tablet pc and like computing devices having a user interface. The electronic device may be a dedicated function device such as personal communications device, a portable or desktop telephone, a personal digital assistant ("PDA"), remote control device, personal digital media system and similar electronic devices.

Additional servers, computers, handheld devices, personal digital assistants, telephones and other devices may also be connected to exchange computer system 100. Moreover, the topology shown in FIG. 1 is merely an example and that the components shown in FIG. 4 may be connected by numerous alternative topologies.

Systems for listing, matching, trading, and clearing traded bundled financial instruments may provide that intraday theoretical prices and end of day settlement prices for the bundled financial instrument to be the same as that of the corresponding full-sized financial instrument. For example, the end of day settlement prices for an E-mini 5-Year Bundled future may be calculated as the average of the end of day settlement prices of the underlying twenty consecutive quarterly Mini-Eurodollar Futures contracts (or full-sized), rounded normally to the nearest 0.00001. One skilled in the art will appreciate that although the above illustrative embodiment provides details on the implementation of aspects of the invention, other implementations and variations on those implementations are contemplated by the disclosure. For example, tick increments may be different, the method of calculating the quoted price may be different, and techniques for rounding may be different, but still fall within one or more aspects of the invention, whether expressly claimed or not.

In accordance with various aspects of the invention, a computerized system for post-trade processing of bundled financial instruments is disclosed. The system may include hardware (e.g., a computer network interface) and/or software for receiving data associated with a position of a bundled financial instrument and storing at least part of the data in a storage device (e.g., hard drive, RAM, flash, etc.). Once received, the system may include a software module (e.g., a position processing module) for confirming the position of the matched bundle. One skilled in the art will appreciate that a position processing module may use the mark-to-market process and other techniques well known in the exchange marketplace to determine and monitor the position of a portfolio. For example, the position processing module may convert the bundled instrument into multiple constituent instruments in a predetermined manner (e.g., fungible 10-to-1). The system may also include a software module for determining the price of the bundled instrument based on an average price of the constituent standardized contracts.

In addition, as explained throughout, the system may include software modules for converting the bundled financial instrument into constituent standardized contracts and/or for converting the bundled financial instruments into a position substantially equivalent to a single full-sized standardized contract. In some examples, the converting may occur at expiration of a leading contract among the group of standardized contracts. One skilled in the art will recognize that one or more of the aforementioned modules may be incorporated and/or separated into a single and/or multiple, respectively, modules.

Figure 5:
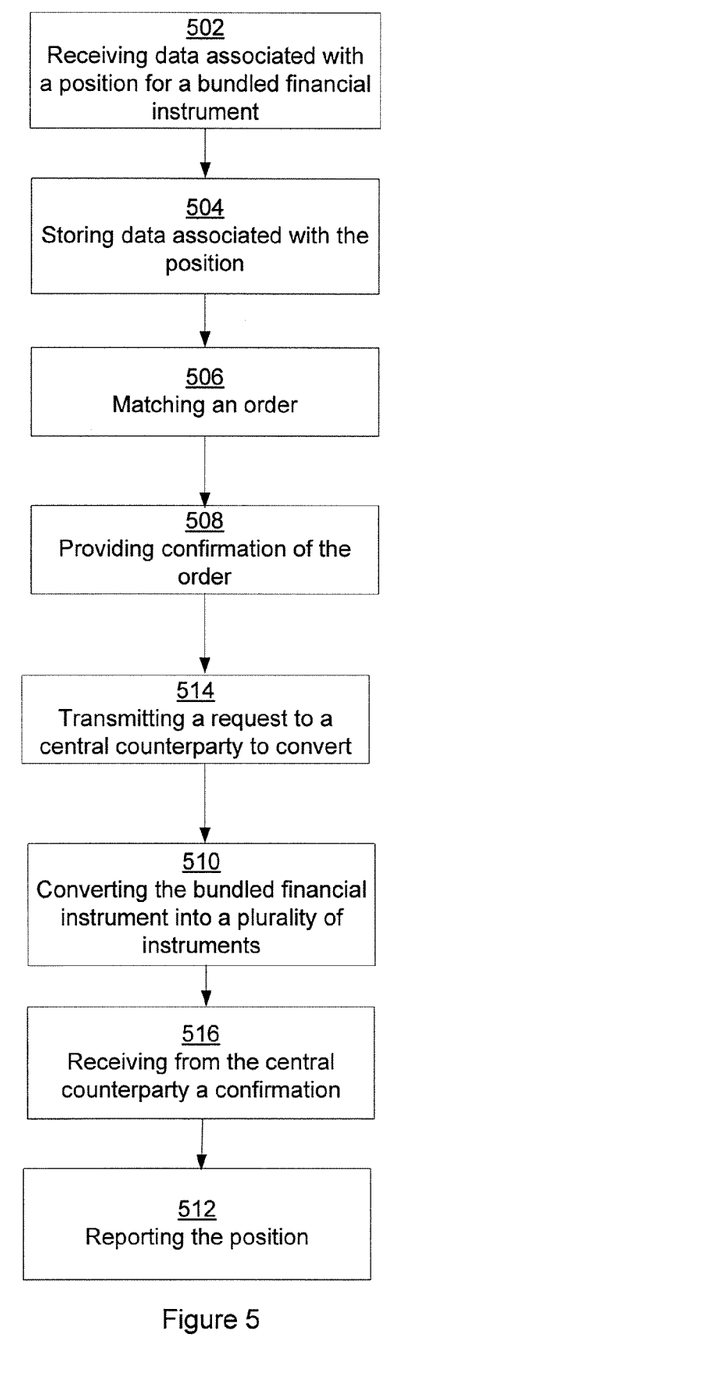
FIG. 5 shows a flowchart depicting a method that may be used to submit orders for bundled financial instruments in accordance with various aspects of the invention.

FIG. 5 illustrates and exemplary method for managing a bundled financial instrument. In step 502, an exchange 100 (or other computer system for receiving and processing orders of financial instruments) may receive data associated with an order for a bundled financial instrument. In step 504, at least part of the data associated with the order may be stored. The data may be stored in a storage device associated with the exchange computer system 400.

In step 506, an order for a financial instrument may be matched with a counterpart bid or ask price. The matching may be performed by a match engine module 406 associated with an exchange 400. In step 508, a confirmation that the order for the bundled financial instrument has matched may be generated. Alternatively, the confirmation may correspond to the execution, subsequent to matching, of the order. One skilled in the art will appreciate that step 506, step 508, and various other steps may be optional and/or omitted under certain scenarios. In some examples, the position of a bundled financial instrument may be received and monitored.

Furthermore, before the bundled financial instrument expires (e.g., when the first of the plurality of short-term financial instruments matures), the bundled financial instrument may be converted into equivalent positions of the constituent instruments in step 510. As explained, these constituent financial instruments may be converted between different types of fungible financial instruments. For example, in some cases the plurality of short-term financial instruments may be fractional-sized futures contracts that expire on consecutive intervals. Thus, when the lead contract expires, another futures contract may be obtained by rolling the remaining positions into a new or reformulated bundled financial instrument. In some examples, a request to convert may be transmitted to a central counterparty in step 514, and a confirmation may be subsequently received from the central counterparty in step 516.

In step 512, the position of the bundled financial instrument or the converted bundled financial instrument may be calculated based on an average price of the plurality of standardized financial instruments. In one example, the average price may be a weighted average price. The position may be reported.

Figure 6:
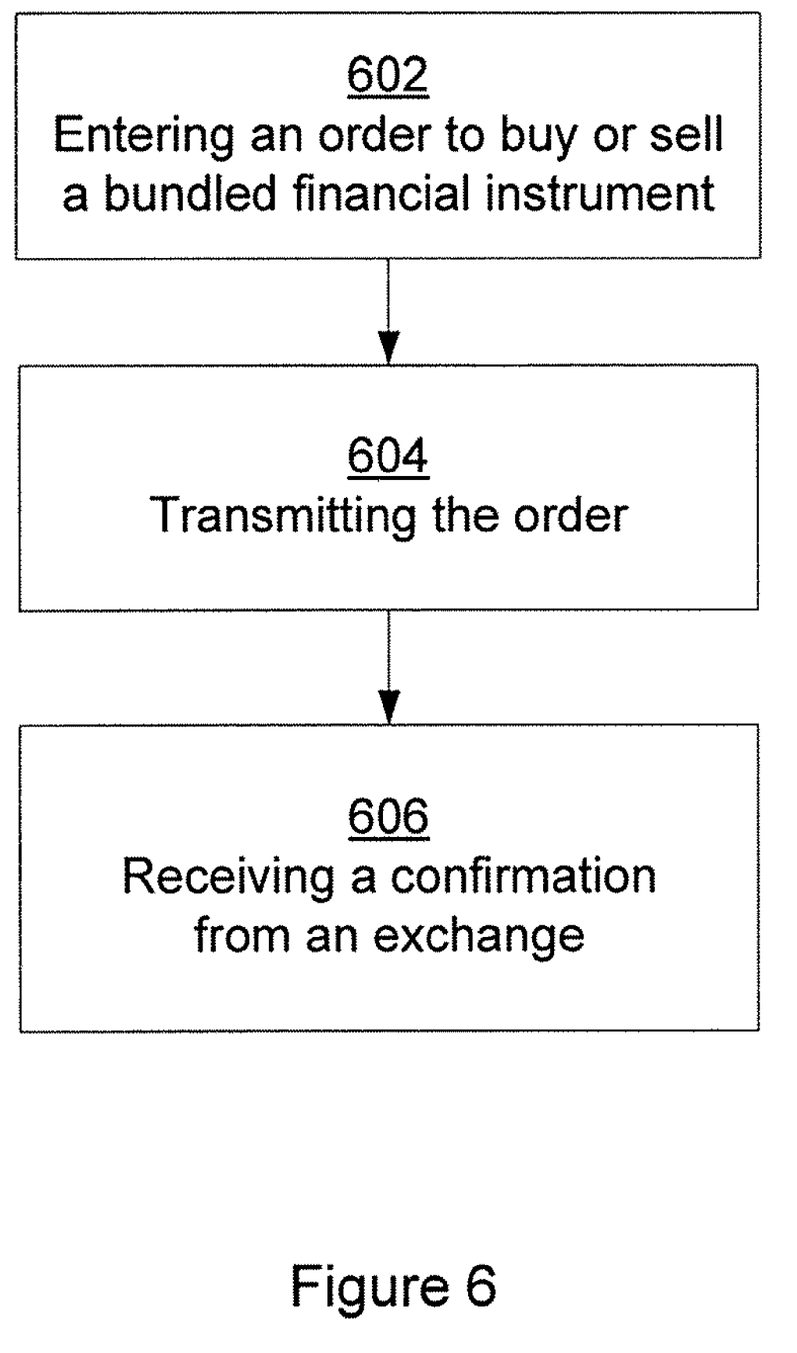
FIG. 6 shows an illustrative network that may be used to implement various aspects of a system for managing a bundled financial instrument in accordance with aspects of the invention.

FIG. 6 illustrates a flowchart for a method for submitting an order for a bundled financial instrument in accordance with aspects of the invention. In step 602, a trader, user, or other entity such as an automatic trading system may enter an order to buy or sell one or more bundled financial instruments. In step 604, the order may be transmitted to a computer device of an exchange 400. The exchange may receive the order and process the order accordingly. In step 606, a confirmation sent from the exchange 100 may be received. In addition, in some embodiments, the confirmation message may indicate the status of the order, such as executed, pending, etc.

One skilled in the art will appreciate that a trader's terminal running the appropriate software may perform the method illustrated in FIG. 6. The software may generate a graphical user interface for the trader to conveniently enter data associated with an order for a bundled financial instrument. The graphical user interface may provide the trader with an opportunity to customize the underlying financial instruments constituting the bundled financial instrument.

Various embodiments have been described and illustrated. However, the description and illustrations are by way of example only. Many more embodiments and implementations are possible within the scope of this invention and will be apparent to those of ordinary skill in the art. The various embodiments are not limited to the described environments, and can be applied to a wide variety of activities, including other types of bundled financial instruments besides Eurodollar bundles.

Examples of other embodiments include mini bundled financial instruments that include more than one type of underlying contracts. Other embodiments include mini bundled financial instruments that a set of underlying contracts that are selected according to investing criteria. The set of underlying contracts may be selected by a trader, or may be exchange listed. Furthermore, the underlying contracts may be held short, long, or a combination thereof. Furthermore, the underlying contracts may mature (i.e., expire) at times other than consecutive quarters or months.

It is intended in the appended claims to cover all such changes and modifications which fall within the true spirit and scope of the invention. Therefore, the invention is not limited to the specific details, representative embodiments, and illustrated examples in this description. Accordingly, the invention is not to be restricted except in light as necessitated by the accompanying claims and their equivalents.

We claim:

1. A computer-assisted trading system, comprising:
a data storage device configured to store information associated with a book of open positions each associated with a bundled financial instrument, the bundled financial instrument including a linear combination of a plurality of standardized contracts associated with an obligation to exchange an asset at a set price on a future date, the open position of the bundled financial instrument being convertible, by a conversion module, into constituent linear combinations of a plurality of standardized contracts, where the open position of the bundled financial instrument appears on the book as a single financial instrument after execution, the open position further remaining until the earlier of a maturity of the bundled financial instrument, conversion of the bundled financial instrument into constituent parts of the linear combination of a plurality of standardized contracts, or combination of the bundled financial instrument with other bundled financial instruments to form a combined open position; and
the conversion module responsive to requests of holders of corresponding open positions to convert the bundled financial instrument into constituent parts of the linear combination of a plurality of standardized contracts.

2. The system of claim 1, where at least one of the plurality of standardized contracts comprises a futures contract.

3. The system of claim 2, where the plurality of standardized contracts comprises consecutive fractional-sized futures contracts each having a fixed weight with respect to a composition of the bundled financial instrument and each having a notional value that is a fraction of a corresponding full-sized standardized contract, the bundled financial instrument being fungible with the full-sized standardized contract.

4. The system of claim 3, where bundled financial instruments decompose into constituent parts of the linear combination of a plurality of standardized contracts at maturity of the bundled financial instrument.

5. The system of claim 4 where maturity of the bundled financial instrument comprises an expiration of a leading contract of the plurality of fractional-sized futures contracts.

6. The system of claim 5, where each standardized contract has an associated variable price and the open position of the bundled financial instrument is a function of the prices of each of the standardized contracts to the bundle, and where a price of the bundled financial instrument is determined according to an average of prices of each of the constituent parts of the linear combination of the plurality of standardized contracts.

7. A computerized method for post-trade handling of open positions for bundled financial instruments, comprising:
   determining an open position associated with a bundled financial instrument including a linear combination of a plurality of standardized contracts associated with an obligation to exchange an asset at a set price on a future date, each standardized contract having an associated variable price, the open position of the bundled financial instrument being a function of the prices for each of the standardized contracts of the bundle and being convertible by a conversion module into the constituent linear combination of a plurality of standardized contracts, where the open position of the bundled financial instrument remains on a book as a single financial instrument after it has been executed, the open position further remaining until the earlier of a maturity of the bundled financial instrument, conversion of the bundled financial instrument into constituent parts of the linear combination of a plurality of standardized contracts, or combination of the bundled financial instrument with other bundled financial instruments to form a combined open position; and
   converting an open position for a bundled financial instrument into open positions associated with each of the linear combination of a plurality of standardized contracts in response to a request of a holder of the open position.

8. The method of claim 7 where the plurality of standardized contracts comprises consecutive fractional-sized futures contracts each having a fixed weight with respect to a composition of the bundle and each having a notional value that is a fraction of a corresponding full-sized standardized contract.

9. The method of claim 8 further comprising:
   converting multiple bundled financial instruments into a single position substantially equivalent to a single full-sized standardized contract.

10. The method of claim 7, comprising:
    converting the bundled financial instrument into constituent financial instruments at maturity of the bundled financial instrument.

11. The method of claim 7, comprising:
    determining the price of the bundled financial instrument based on a function of the prices of each of the constituent standardized contracts.

12. The method of claim 11, where the plurality of financial instruments includes at least one selected from a group consisting of futures contracts, options, bonds, annuities, currencies, commodities, and combinations thereof.

13. A system for processing positions for financial instruments comprising:
    a processor configured to process data associated with a book of open positions associated with a bundled financial instrument including a linear combination of a plurality of standardized contracts associated with an obligation to exchange an asset at a set price on a future date, each standardized contract having an associated variable price, the open position of the bundled financial instrument being a function of the prices for each of the standardized contracts of the bundle and being convertible, by a converter, into the constituent linear combination of a plurality of standardized contracts, where the open position of the bundled financial instrument remains on the book as a single financial instrument after it has been executed, the open position further remaining until the earlier of a maturity of the bundled financial instrument, conversion of the bundled financial instrument into constituent parts of the linear combination of a plurality of standardized contracts, or combination of the bundled financial instrument with other bundled financial instruments to form a combined open position; and
    the converter configured to convert a bundled financial instrument into a plurality of constituent financial instruments in response to a request of a holder of the open position.

14. The system of claim 13, where the converter is configured to convert in a predetermined manner the bundled financial instrument into the plurality of constituent financial instruments at the earlier of a request of the holder of the position associated with the bundled financial instrument or maturity of the bundled financial instrument.

15. The system of claim 14, further comprising:
    a match engine module configured to match orders for bundled financial instruments; and
    a central clearinghouse for the bundled financial instruments, the central clearinghouse clearing matched orders for bundled financial instruments and periodically providing confirmation of an open position associated the bundled financial instrument.

16. The system of claim 15, further comprising a mark-to-market module configured to periodically determine a current open position associated with the bundled financial instrument accordingly.

17. The system of claim 16, where the open position of the bundled financial instrument is determined according to an average price of the linear combination of a plurality of standardized contracts.

18. The system of claim 14, where the central clearinghouse converts open positions for bundled financial instruments to the constituent linear combination of a plurality of standardized contracts at a request of the holder of the open position.

19. The system of claim 14, where the plurality of standardized contracts comprises consecutive fractional-sized futures contracts each having a fixed weight with respect to a composition of the bundle and each having a notional value that is a fraction of a corresponding full-sized standardized contract and the central clearinghouse converts open positions for bundled financial instruments to a single position substantially equivalent to a single full-sized standardized contract at the request of the holder.

20. A method of administering a portfolio having at least one bundled financial instrument, the method comprising:
    receiving, using a processor, data associated with an open position associated with a matched order for a bundled financial instrument, the bundled financial instrument including a linear combination of a plurality of standardized contracts associated with an obligation to exchange an asset at a set price on a future date, each standardized contract having an associated variable price, the open position of the bundled financial instrument being a function of the prices for each of the standardized contracts of the bundle and being convertible, in response to a request of a holder of the open position, by a conversion module into the constituent linear combination of a plurality of standardized contracts, where the open position of the bundled financial instrument appears on a book as a single financial instrument after execution and is available until a maturity of the bundled financial instrument; and reporting, using the processor, the open position for the bundled financial instrument according to an average price of the linear combination of a plurality of standardized contracts.

21. The method of claim 20, comprising:

at expiration of a leading constituent of the bundled financial instruments, converting, using a conversion module, in a predetermined manner the bundled financial instrument into a plurality of remaining constituent financial instruments.

22. The method of claim 20, where the plurality of financial instruments are fractional-sized futures contracts, each expiring on periodic intervals.

23. The method of claim 20, comprising:

transmitting, using the processor, a request to a central counterparty to convert the open position associated with the bundled financial instrument to an open position associated with each of the constituent parts of the bundled financial instruments; and receiving, using the processor, from the central counterparty, a confirmation of the conversion, the confirmation including the open position in each of the constituent parts.

24. The method of claim 20, comprising:

transmitting, using the processor, a request to a central counterparty to convert open positions associated with multiple bundled financial instruments to a single open position associated with a corresponding full-sized standardized contract, the plurality of standardized contracts comprising consecutive fractional-sized futures contracts each having a fixed weight with respect to a composition of the bundle and each having a notional value that is a fraction of the full-sized standardized contract; and receiving, using the processor, from the central counterparty, a confirmation of the conversion, the confirmation including the open position for the single full-sized standardized contract.

* * * * *